United States Patent Office 3,515,541
Patented June 2, 1970

3,515,541
PROCESS FOR THE RECOVERY OF NOBLE METALS
Helmut Wimmer, Linz-Urfahr, Anton Wagner, Linz (Danube), Rudolf Staudigl, Pasching, and Hermann Rudorfer, Linz (Danube), Austria, assignors to Osterreichische Stickstoffwerke Aktiengesellschaft, Linz (Danube), Austria
No Drawing. Filed May 3, 1967, Ser. No. 635,677
Int. Cl. C22b 11/02; B01j 11/04, 11/08
U.S. Cl. 75—83                                            2 Claims

ABSTRACT OF THE DISCLOSURE

There is provided an improvement in the process for the recovery of precious metals which are lost during exothermic chemical reactions performed on catalysts consisting of such metals or alloys thereof. In a known process, heat-resisting acid-insoluble materials are employed in chemical devices for such metals. The recovery capability of such materials is increased by way of the present invention by an activation treatment prior to their employment in collection devices. The materials are subjected to chemical treatment wherein the chemicals attack the surface of the collection substances and increase substantially the surface area thereof. Following the treatment the substances are employed in the collection devices in the known manner.

---

This invention relates to a process of recovering precious metals, particularly of platinum metals, which are lost, e.g. by evaporation or mechanical separation during exothermic chemical reactions performed on catalysts consisting of such metals or alloys thereof.

In order to recover the largest possible amount of the catalytic precious metal which is evaporated or which is lost in the form of dust it has been proposed to use very expensive collecting substances and collecting devices and to arrange the same at various points of the reaction apparatus. In some cases the recovered amounts of platinum, rhodium or other alloying constituents of such precious metal catalysts were unsatisfactory and in other cases the manipulation and processing required for separating and isolating said metals were complicated and the collecting substances used were expensive themselves and in danger of being lost.

In U.S. Pat. 2,920,953, issued to Hermann Rudorfer on Jan. 12, 1960, an improved process is disclosed for the recovery of the previous metals. The basic idea of the invention described in the patent resides on the one hand in the fact that an inexpensive and easily processable collecting material is used which consists of a representative of one of certain groups of substances, either alone or in a mixture with other representatives of the same group, said substances being stable and solid, such as oxides, at the operating temperatures at which the catalyst is used, or adapted to form such stable and solid substances at said operating temperatures.

Substances which are suitable for use according to the patent comprise oxides, hydroxides, carbonates, nitrates, acetates, ferrites, if desired also aluminates, zincates and phosphates of calcium, magnesium, barium, strontium or of heavy metals which give soluble oxides, such as iron or copper.

When the collecting power of the collecting materials which consist of or originate from such compounds has been exhausted the collecting materials are separated from their precious metal content by being dissolved in appropriate solvents, in which the precious metals are insoluble.

In the process described in the patent a gas containing a precious metal such as that from an ammonia combustion furnace using a platinum and/or a platinum-rhodium catalyst is passed at a temperature of about 800° to 900° C. through a gas-permeable layer of solids, the surface of which consists essentially of substantially silicate-free acid-soluble material. In this manner the precious metal is collected on the acid-soluble collecting material.

The precious metal is then recovered by dissolving the acid-soluble material in an acid solvent in which the precious metal is substantially insoluble.

In a particular aspect the patent discloses the replacing of the oxide materials previously mentioned as collecting materials by heat-resisting and acid-insoluble bodies. The collecting effect of these bodies when used alone being known to be insufficient. These bodies may consist of baffle bodies of ceramics, vitreous silica or other artificial substances or of natural mineral substances having the same properties.

In this case an optimum collecting effect is indicated to be achieved if the catalytic platinum rhodium net is supported on a bed of the same material as the collecting bed. In this case it is also preferable not to dispose the collecting layer covered with a nonscaling wire net or the like in close proximity of the hot platinum catalyst but to dispose it at some distance from the catalyst in a region of reduced temperature, about 600–750° C., preferably at 680° C. In this case any pipe coils arranged between the catalyst and the collecting layer in order to produce steam will not have an adverse effect. It is of special advantage if the velocity of the gas is not higher in the collecting layer than in the catalyst net.

The baffle bodies may be of any shape and size known for this purpose and may consist, e.g., of 8 x 8 mm. or 5 x 5 mm. Raschig rings or of saddle-shaped bodies or other particulate materials.

Whereas when used alone such a collecting net, which is entirely untreated, has an unsatisfactory collecting activity, the covering consisting, e.g., of a wire grid or wire net of the type described proves to be an excellent promoter of this activity and is capable of increasing the recovery achieved with such bed from about one-third of the lost platinum—this is the value achieved without a covering net—to and above 85%.

In this connection it is interesting to note that the covering net described does not take part in any appreciable degree in the collecting action so that each covering net may be used many times for this purpose and will contain only just detectable traces of precious metals when it has finally become useless due to scaling.

In such a collecting device the collecting material and possibly even the covering member can still be left in the reaction apparatus through additional platinum net periods (furnace heats) even if a thin platinum coating has been formed on the collecting material, whether the latter consists of ceramics or other material, because in the present case the collecting activity of the collecting bodies does not depend on the nature of their surface but on the combination, provided according to the invention, of such bodies with the covering net or the like of heat-resisting, nonscaling material.

The removal of the platinum metal covering from the removed baffle bodies is effected with aqua regia, or if desired, with chlorine water with an addition of air. These fluids may be kept in circulation. This treatment will result in the formation of concentrated solutions. If some platinum has deposited on the bed of carrying bodies which carry the catalytic noble metal net that bed is processed together with the just removed layer of the collecting material to recover platinum.

The process according to this case may also be performed in a collecting device which is separate from the catalytic reaction apparatus because the hottest reaction zone should be avoided in any case to achieve on optimum collecting effect, as has been described hereinbefore.

A further simplification is also possible in this case by dividing the bed of baffle bodies forming the collecting layer by intervening wire nets of the type described hereinbefore into two or more layers. In that case it is sufficient to lift the covering net and to remove only the uppermost collecting layer and replace it by a layer of fresh material during or after some successive replacements of the catalytic platinum rhodium net. Thereby unnecessary processing costs for the mass of layers which have been impregnated only in a small degree can be eliminated until these layers have also collected a sufficient amount of platinum.

Particularly important to this aspect of the invention disclosed by the patent is FIG. 3 of the drawing which is described at column 6, lines 36 to 51 of the patent.

By way of the present invention there is provided an improvement in the aspect of the invention discussed in U.S. Pat. No. 2,920,953 wherein a heat-resistant and acid-insoluble body is employed as collecting material. The improvement relates to employing in such process a heat-resistant acid-insoluble refractory solid material which has been subjected to a pre-treatment in order to activate the said material.

The material employed may be any of the previously known materials employed as baffle bodies in the known process. There may be mentioned ceramics, vitreous silica and quartz or other artificial and natural mineral substances possessing substantially the same properties. The materials may be employed for example, in the form of Raschig rings or saddle-shaped bodies or other particulate forms.

The treatment to which the materials are subjected in order to activate them is a treatment by which the surface area of the materials is substantially increased. The treatment can serve to either remove or deposit material. Such treatment can, for example, be a chemical treatment. The effectiveness of a chemical treatment can be approximated by measuring the surface area of the material in square meters per gram.

Especially suitable chemicals for accomplishing the pretreatment activation of the materials in accordance with the invention are strongly alkaline materials such as solutions of caustic soda, caustic potash and milk of lime. Also strongly acid substances may be utilized for such treatment as for example hydrofluoric acid and hydrochloric acid as well as sodium hypochloride, sulfurous acid and the like.

The pretreatment of the collection materials in order to activate them is accomplished by bringing such materials into intimate contact, for example, with a chemical treatment solution for time periods extending for from one hour up to about 10 days and at temperatures ranging from 0° C. up to the boiling point of the chemical treatment solution.

The conditions under which the treatment is carried out vary according to the specific materials employed. Such conditions are chosen in order to increase substantially the surface area of the materials without materially altering the mechanical strength of the collecting bodies as for example against abrasion and pressure and the like.

Following a chemical treatment the materials are washed with water in order to neutralize the chemicals and are subsequently dried. Following the drying the materials are ready for use in the process.

By means of the previously described surface treatment a surface area increase of up to 10 or more times that of the unused and untreated collection material is obtained. There is a corresponding increase in the collection efficiency of the material. This increase in turn permits a space-saving decrease in the amount of the collection materials employed or a considerable increase in the quantity of recovered precious metal.

The use of a gas-permeable metallic structure which covers the layer of trapping shapes, such as for example a heat-resistant wire-net, for causing or assisting the trapping effect of the ceramic baffle shapes, following the chemical pre-treatment herein described, is largely restricted to the mechanical effect as regards equalization of temperature or protection against disturbances of the uniform position and layer height of the packing if sudden pressure fluctuations occur. In the optimum case of increase of the surface area of the trapping shapes, such a metallic covering structure is dispensable without reducing the trapping effect and may be omitted.

The treated and activated materials are employed in the process under the conditions described in the previously mentioned Rudorfer patent. The materials may be used in conjunction with a gas permeable metallic member which is stable at red heat and which rests on a layer of collection material. More importantly, and in a particularly important embodiment of the invention, the material which has been treated is employed as a layer of collection material which is separated from the support material for the platinum catalyst. Such layer may be a single layer or it may be formed into a plurality of layers separated by metallic nets as is clearly brought out in the United States patent, i.e. No. 2,920,953 previously referred to.

The optimum effect is connected with the prerequisite that the precious metal nets, particularly Pt-Rh, which act as catalysts rest on a support of pretreated or untreated ceramic shapes of approximately uniform type, which naturally and essentially are at the temperature of the catalyst nets and that, furthermore, the ceramic or mineral trapping shapes which have been pretreated in accordance with the invention are disposed in a zone which is at a temperature lower than the above-mentioned supporting layer.

Having disclosed the invention the same is illustrated by way of the following examples. It must be noted that these examples are purely illustrative and are not to be taken as exhaustive of the invention.

EXAMPLE 1

An apparatus substantially similar to that shown and described in FIG. 3 of U.S. Pat. No. 2,920,953 was employed. The apparatus was an ammonia combustion furnace approximately 300 mm. diameter. Three platinum rhodium nets (10% rhodium content by weight) were employed supported by a layer of 8 x 8 mm. Raschig rings of porcelain. The support layer was 70 mm. high. The support layer was followed by a gas cooler. Following the gas cooler the platinum recovery device was installed. The device contained a 220 mm. high layer of 8 x 8 mm. Raschig rings of porcelain. The layer was divided longitudinally into two halfs. The first half of the layer was of untreated rings. The remaining half was of rings which had previously been boiled for 2.5 hours in a 40% caustic soda solution and subsequently was with water to neutralize. The untreated rings had a surface area of 0.10 square meter per gram (sq.m./g.) and the treated (activated) ones a surface area of 1.3 sq.m./g.

Over a period of 619 hours 64,376 cubic meters (cu.m.) of an ammonia-air mixture containing 12.09 vol. percent of ammonia was blown through the furnace, i.e. 104 cu. m. per hour or a total of 4.94 metric tons of nitrogen. The mixture was preheated to 30° C. The temperature of the platinum rhodium nets was 850° C., and the temperature of the recovery layer was 640° C. The measured platinum loss was 825 mg.

The processing of the Raschig rings using aqua regia resulted in the following precious metal recovery: 46.2 mg. from the Raschig rings which carried the nets, 107 mg. from the untreated Raschig rings and 310 mg. from the activated Raschig rings. Expressed in percentages: 31.5% recovery from the untreated, and 80.7% recovery from the activated Raschig rings.

EXAMPLE 2

An ammonium combustion furnace substantially similar to FIG. 3 of U.S. Pat. No. 2,920,953 was employed. In the furnace 300 mm. in diameter and containing 3 platinum rhodium nets (10% rhodium by weight) were placed on a support layer of 5 x 5 mm. porcelain Raschig rings. The support layer was followed by a gas cooler. The cooler was followed by a layer 220 mm. high of 5 x 5 mm. porcelain Raschig rings. The support layer was followed by a gas cooler. The cooler was followed by a layer 220 mm. high of 5 x 5 mm. porcelain Raschig rings. The latter layer was longitudinally divided into two halfs. The first half was of untreated Raschig rings having a surface area of 0.25 sq.m./g. The remaining half was composed of rings which had previously been treated (activated) by boiling for 5 hours in a 40% NaOH solution and subsequently washed with water for neutralization. The activated rings had a surface area of 4.85 sq.m./g.

Over a period of 470 hours 49,350 cu. m. of an ammonia-air mixture containing 12.08 vol. percent of ammonia was blown through the furnace, i.e. 105 cu. m. per hour of a total of 3.79 metric tons of nitrogen. The mixture was pre-heated to 30° C. The temperature of the platinum-rhodium nets was 820° C., the temperature in the recovery layer was 640° C. The platinum loss was 672 mg.

The processing of the Raschig rings using aqua regia resulted in the following precious metal recovery: 18.7 mg. from the Raschig rings which carried the nets, 95.0 mg. from the untreated Raschig rings, and 238.0 mg. from the activated Raschig rings. Expressed in percentages: 31.0% recovery from the untreated and 73.6% recovery from the activated Raschig rings.

Having described the invention what is claimed is:

1. In a process for the recovery of precious metals from gases containing same, which process consists of passing gases containing precious metals, in succession, thru:
    (A) a catalyst net of said precious metal at elevated temperature,
    (B) a catalyst supporting layer of acid insoluble refractory solids,
    (C) a collecting layer of acid insoluble refractory solids which is at a temperature high enough to enable said precious metals to be deposited upon the surface of said collecting layer solid but is lower than the temperature of the catalyst net;
    depositing the precious metals on said collecting layer solids;
    and subsequently recovering the semiprecious metals on said collecting layer solids;
    the improvement consisting of using ceramics as the acid insoluble refractory solids of the collecting layer and boiling said ceramics for more than one hour with a strongly alkaline material selected from the group consisting of caustic soda, caustic potash and milk of lime prior to initial employment of said ceramics in said recovery process.

2. In a process for the recovery of precious metals from gases containing same, which process consists of passing gases containing precious metals, in succession, thru:
    (A) a catalyst net of said precious metal at elevated temperature,
    (B) a catalyst supporting layer of acid insoluble refractory solids,
    (C) an apertured member of metallic material which is stable at red heat,
    (D) a collecting layer of acid insoluble refractory solids which is at a temperature high enough to enable said precious metals to be deposited upon the surface of said collecting layer solid but is lower than the temperature of the catalyst net;
    depositing the precious metals on said collecting layer solids;
    and subsequently recovering the semiprecious metals on said collecting layer solids;
    the improvement consisting of using ceramics as the acid insoluble refractory solids of the collecting layer and boiling said ceramics for more than one hour with a strongly alkaline material selected from the group consisting of caustic soda, caustic potash and milk of lime prior to initial employment of said ceramics in said recovery process.

References Cited

UNITED STATES PATENTS

| 1,937,489 | 11/1933 | Jenness | 252—477 X |
| 2,226,113 | 12/1940 | Chastain | 23—1 X |
| 2,895,819 | 7/1959 | Fiedler | 75—20 |
| 2,920,953 | 1/1960 | Rudorfer | 75—83 X |

FOREIGN PATENTS

| 892,074 | 3/1944 | France. |

HENRY W. TARRING, II, Primary Examiner

U.S. Cl. X.R.

75—136; 23—1; 252—181.6, 472, 477